United States Patent
Dias Moises et al.

(10) Patent No.: US 12,067,231 B2
(45) Date of Patent: Aug. 20, 2024

(54) ELECTRONIC DEVICES AND CORRESPONDING METHODS FOR CAPTURING IMAGE QUANTITIES AS A FUNCTION OF TOUCH INPUT TYPE

(71) Applicant: Motorola Mobility LLC, Chicago, IL (US)

(72) Inventors: Mauricio Dias Moises, Campinas (BR); Rahul Bharat Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 275 days.

(21) Appl. No.: 17/752,271

(22) Filed: May 24, 2022

(65) Prior Publication Data
US 2023/0409188 A1 Dec. 21, 2023

(51) Int. Cl.
*G06F 3/04883* (2022.01)
*G06F 3/01* (2006.01)
*G06F 3/0484* (2022.01)

(52) U.S. Cl.
CPC .......... *G06F 3/04883* (2013.01); *G06F 3/017* (2013.01); *G06F 3/0484* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 9,146,674 B2 * | 9/2015 | Karlsson | G06F 3/04886 |
| 10,845,921 B2 | 11/2020 | Alameh | |
| 11,770,612 B1 * | 9/2023 | Desai | H04N 23/6812 |
| | | | 348/208.4 |
| 2008/0168403 A1 * | 7/2008 | Westerman | G06F 3/0488 |
| | | | 715/863 |
| 2009/0160952 A1 | 6/2009 | Nakakuki | |
| 2010/0315519 A1 | 12/2010 | Watanabe | |
| 2013/0033593 A1 * | 2/2013 | Chinnock | A61B 3/14 |
| | | | 348/78 |
| 2014/0085492 A1 * | 3/2014 | Petrescu | H04N 23/6811 |
| | | | 348/208.1 |
| 2015/0097978 A1 | 4/2015 | Lee | |
| 2016/0034140 A1 * | 2/2016 | Navsariwala | G06F 3/0488 |
| | | | 715/788 |

(Continued)

OTHER PUBLICATIONS

Wobbrock et al. "The performance of hand postures in front- and back-of-device interaction for mobile computing," Mar. 27, 2008, Int. J. Human-Computer Studies 66 (2008) 857-875, https://faculty.washington.edu/wobbrock/pubs/ijhcs-08.pdf.*

(Continued)

*Primary Examiner* — Ryan Barrett
(74) *Attorney, Agent, or Firm* — Philip H. Burrus, IV

(57) ABSTRACT

An electronic device includes a device housing supporting a user interface, one or more touch sensors, and at least one image capture device. One or more processors cause, in response to the user interface receiving user input initiating an image capture operation, the at least one image capture device to capture a first plurality of images when the one or more touch sensors detect a multi-handed touch input and a second plurality of images when the one or more touch sensors detect a single-handed touch input.

20 Claims, 8 Drawing Sheets

(56) References Cited

U.S. PATENT DOCUMENTS

| | | | |
|---|---|---|---|
| 2016/0165156 A1* | 6/2016 | Liege | H04N 23/54 |
| | | | 348/216.1 |
| 2016/0212333 A1* | 7/2016 | Liege | H04N 23/45 |
| 2016/0269637 A1 | 9/2016 | Shibata | |
| 2018/0131873 A1 | 5/2018 | Vacura | |
| 2021/0124451 A1* | 4/2021 | Zhao | G06F 1/169 |
| 2022/0004788 A1* | 1/2022 | Tang | G06V 10/803 |
| 2024/0022815 A1* | 1/2024 | Desai | H04N 23/683 |

OTHER PUBLICATIONS

Goel, et al., "GripSense: Using Built-In Sensors to Detect Hand Posture and Pressure on Commodity Mobile Phones", University of Washington; Published Oct. 7, 2012; Available online at https://faculty.washington.edu/wobbrock/pubs/uist-12.pdf.

"Take Photos in the Dark with Night Mode on Your Galaxy Phone", Samsung Support; Unknown Exact Publication Date but believed to be prior to filing of present application; Viewed online https://www.samsung.com/us/support/answer/ANS00086006/.

Mills, Matt, "How to Take Photos with Night Mode on All Android Phones", ITIGIC; Published Jan. 17, 2021 online at https://itigic.com/how-to-take-photos-with-night-mode-on-all-android-phones/.

Jerabek, Kelly L., "Notice of Allowance", U.S. Appl. No. 17/752,274; filed May 24, 2022; Mailed Jun. 29, 2023.

Guiness, Harry, "What is Image Stabilization, and How Does it Work?", How-To-Geek; Published Mar. 15, 2017 online at https://www.howtogeek.com/298560/what-is-image-stabilization-and-how-does-it-work/.

Liang, Chia-Kai, "Fused Video Stabilization on the Pixel 2 and Pixel 2 XL", Google AI Blog; Published Nov. 10, 2017 online at https://ai.googleblog.com/2017/11/fused-video-stabilization-on-pixel-2.html.

* cited by examiner

ELECTRONIC DEVICES AND CORRESPONDING METHODS FOR CAPTURING IMAGE QUANTITIES AS A FUNCTION OF TOUCH INPUT TYPE

BACKGROUND

Technical Field

This disclosure relates generally to electronic devices, and more particularly to electronic devices having image capture devices.

Background Art

The use of portable electronic devices, such as smartphones and tablet computers, has become ubiquitous. With increasing computational power, the owners of such devices use the same not only to communicate with others, but also to manage financial accounts, track health information, manage calendaring and address book data, watch television shows and movies, interact with social media sites, engage in on-line commerce, and to surf the web.

Most of these electronic devices include some form of image capture device, which may include one or more cameras. As the quality of these cameras has improved, people are increasingly using the image capture devices in smartphones and tablet computers as their primary image capture device, eschewing traditional stand-alone image capture devices such as single-lens-reflex cameras. It would be advantageous to have methods and systems to make the image capture devices of portable electronic devices perform even more optimally so as to increase the quality of captured images.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
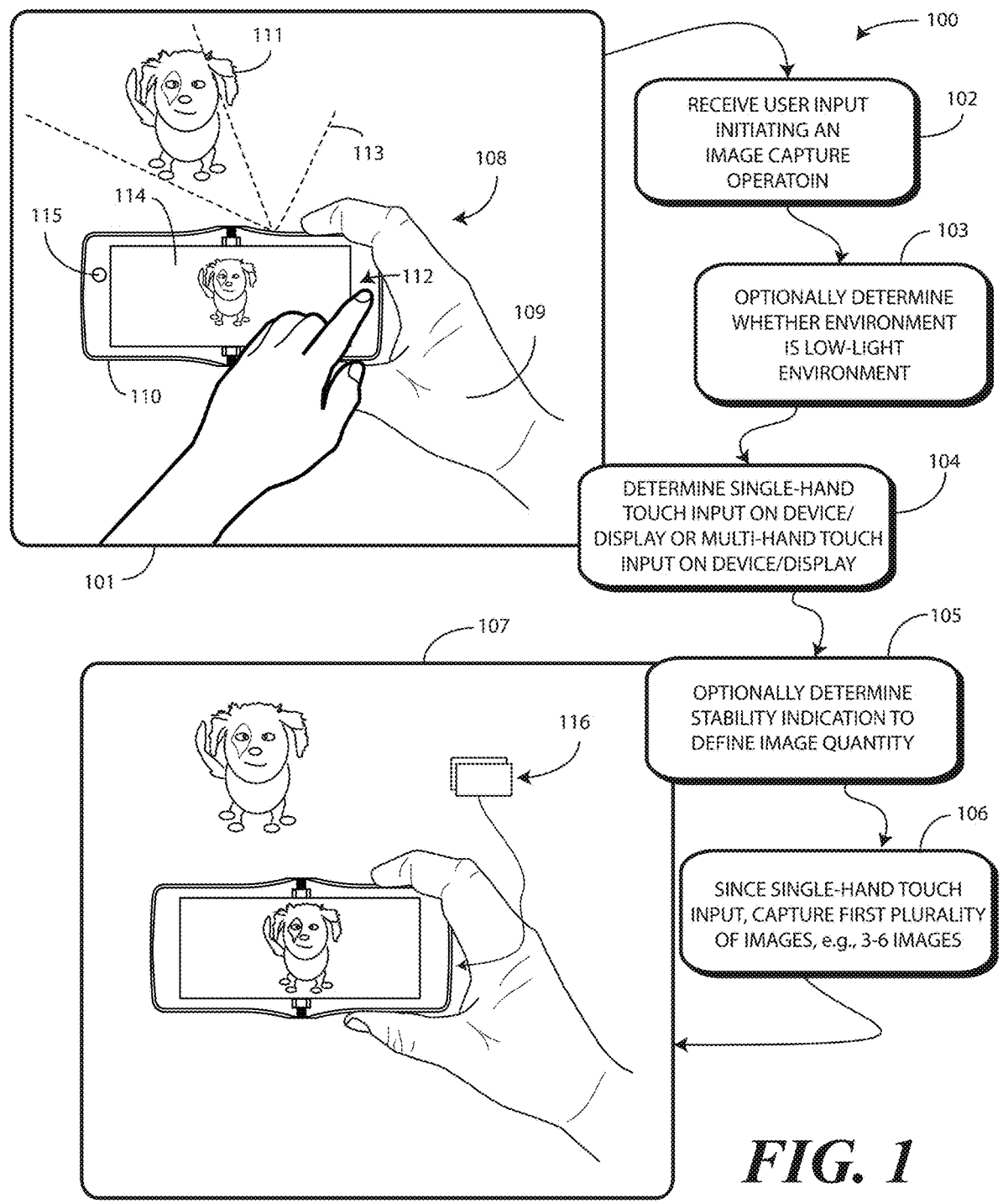
FIG. 1 illustrates one explanatory method and system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to determining whether a received touch input is a single-handed touch input or a multi-handed touch input and capturing, with an image capture device, a first plurality of images when one or more touch sensors detect a multi-handed touch input and a second plurality of images when the one or more touch sensors detect a single-handed touch input. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of capturing a first quantity of images when an electronic device is being supported by a multi-handed touch input and a second quantity of images when the electronic device is being supported by a single-handed touch input as described herein. The non-processor circuits may include, but are not limited to, an image capture device, a radio receiver, a radio transmitter, signal drivers, clock circuits, power source circuits, and user input devices.

As such, these functions may be interpreted as steps of a method to perform the capture of the first quantity of images when the electronic device is being supported by the multi-handed touch input and the second quantity of images when the electronic device is being supported by the single-handed touch input. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods, devices, and systems that capture a quantity of images based upon the type of touch input an electronic device is receiving when an image capture operation is initiated. In one or more embodiments, when one or more touch sensors determine that the electronic device is receiving a multi-handed touch input, one or more processors cause an image capture device to capture a first plurality of images. By contrast, when the one or more touch sensors determined that the electronic device is receiving a single-handed touch input, the one or more processors cause the image capture device to capture a second plurality of images that is different from the first plurality of images. Illustrating by example, while the first plurality of images may be thirty or more images, the second plurality of images may be only three to six images.

Embodiments of the disclosure contemplate that the amount of "shake" a handheld electronic device experiences is reduced when a user is holding the electronic device with two hands. This is true because the electronic device can be balanced better when two hands are used. Additionally, the electronic device is less likely to move when a user initiates an image capture operation by, for example, tapping a user interface icon corresponding to a "shutter" button. Accordingly, embodiments of the disclosure employ this touch input as a proxy for device stabilization to select how many images should be captured in response to user input initiating an image capture operation.

Embodiments of the disclosure contemplate that since the image sensors in electronic devices such as smartphones are relatively small, these devices frequently use a post-processing operation known as "computational photography" to improve the overall quality of a captured image. One common technique used in computational photography is known as "frame stacking." When using frame stacking, multiple image frames are captured in response to user input requesting that a single image be captured in an image capture operation. Thereafter, either a best image from the multiple image frames can be selected or, alternatively, these multiple image frames can be combined in post-processing to obtain an optimize image. Regardless of the technique used, capturing multiple images when a user only desires a single image, and then using post-processing steps incorporating the multiple images to obtain an enhanced image, improves the overall image quality of the final processed image. This is particularly true in low light environments or in environments where light densities change dramatically across a frame.

One problem with frame stacking is that it consumes processing power. Accordingly, it would be advantageous to optimize the number of frames captured for each image as a function of external conditions affecting the electronic device. In general, when more image frames are used in the frame stacking process, the better the image quality of the final image will be. However, for more image frames used in the frame stacking process, more processing power—and time—is required to obtain that final image.

Since movement of an electronic device capturing an image can greatly affect the quality of the resulting image, capturing more image frames for the frame stacking process when the electronic device is shaking results in a better final image. However, fewer image frames are required when the electronic device is more stable. Thus, in stable conditions an equally good image can be obtained with fewer image frames input into the frame stacking process.

Advantageously, embodiments of the disclosure use touch input as a proxy for device stabilization to select how many images should be captured for a frame stacking process in response the initiation of an image capture operation. When the electronic device is receiving a multi-handed touch input, embodiments of the disclosure conclude that a user is trying to hold the electronic device in a very stable manner. Accordingly, one or more processors of the electronic device cause the image capture device to capture more images for the frame stacking process. By contrast, when a person is supporting an electronic device with only a single-handed touch input, a smaller number of images is captured for the frame stacking process.

In one or more embodiments, when the multi-handed touch input is detected, the initiation of an image capture operation to capture an image with an image capture device results in an increased number of image frames being captured for the frame stacking process. Illustrating by example, when a person is trying to hold the electronic device in a very still mode while capturing an image in a low-light environment, one or more processors of the electronic device may cause the image capture device to capture thirty or more frames to be used in the frame stacking process. By contrast, when one or more touch sensors detect that the electronic device is being supported by a single-handed touch input, the one or more processors may only cause the image capture device to capture three to six images for frame stacking. Advantageously, embodiments of the disclosure combine both a grip detection proxy for a user's intent and environmental conditions with a dynamic frame stacking process to obtain enhanced image quality while minimizing computational bandwidth and processing time.

In one or more embodiments, an electronic device includes a device housing supporting a user interface, one or more touch sensors, and at least one image capture device. The electronic device also includes one or more processors operable with the user interface, the one or more touch sensors, and the at least one image capture device.

In one or more embodiments, the one or more processors cause, in response to the user interface receiving user input initiating an image capture operation, the at least one image capture device to capture a first plurality of images when the one or more touch sensors detect a multi-handed touch input. By contrast, when the one or more touch sensors detect a single-handed touch input, the one or more processors cause the image capture device to capture a second plurality of images that is different from the first plurality of images. In one or more embodiments, the first plurality of images includes a greater number of images than the second plurality of images. These images can be fed into a frame stacking process or other post-processing image enhancement process to obtain a final image in response to the user input initiating the image capture operation.

Lighting conditions can also affect the number of images that are captured in response to the user input initiating the image capture operation. Illustrating by example, in one or more embodiments the electronic device comprises a light sensor. In one or more embodiments, the one or more processors cause the at least one image capture device to capture the first plurality of images only when the one or more touch sensors detect the multi-handed touch input concurrently with the light sensor detecting a low-light condition within an environment of the electronic device. In one or more embodiments, the low-light condition is characterized by a light density of less than one hundred lux within an environment of the electronic device.

The light sensor can be used in other ways as well. For instance, when the light sensor detects an unbalanced ambient light level within an environment of the electronic device, such as when a scene includes sunlight shining through a window into a dark room, the one or more processors can cause the at least one image capture device to capture the first plurality of images when the electronic device is being supported by the multi-handed touch input and the unbalanced ambient light level within the environment of the electronic device exceeds a predefined threshold.

A motion sensor can also be used to alter the number of images included in the first plurality of images and/or second plurality of images as well. In one or more embodiments, one or more processors detect, using a motion sensor, a stability indication of the electronic device in response to a user input initiating an image capture operation. In one or more embodiments, the one or more processors increase the number of images in the first plurality of images when the stability indication of the electronic device is less than a predefined threshold.

Accordingly, in one or more embodiments an electronic device includes a light sensor operable to determine the luxe level of ambient lighting conditions in response to receiving user input initiating an image capture operation. The light sensor can optionally determine that the environment of the electronic device is experiencing a low-light condition when the light density is less than one hundred lux in one or more embodiments.

One or more touch sensors then determine whether the user is gripping the electronic device with one hand or two. Said differently, the one or more touch sensors determine whether the electronic device is receiving a multi-handed touch input or a single-handed touch input.

This can be determined in any number of ways. For instance, in one or more embodiments the one or more touch sensors detect the multi-handed touch input when receiving touch input from the fingers or a palm on both sides of a user interface, one example of which is a touch-sensitive display. Alternatively, one or more processors may monitor a motion sensor such as an accelerometer to determine the motion of the electronic device.

In still other embodiments, another image capture device facing the user can determine whether its field of view is blocked by a user's hand or fingers to determine that the electronic device is receiving the multi-handed touch input. Embodiments of the disclosure presume that the other image capture device facing the user may indeed have its field of view blocked by a hand when holding the electronic device from the opposite edges while capturing an image with the image capture device facing away from the user. Accordingly, a blocked field of view of an image capture device facing a user can be used to identify, or alternatively confirm, that the electronic device is being supported by the multi-handed touch input. Other techniques for detecting the multi-handed touch input will be described below. Still others will be obvious to those of ordinary skill in the art having the benefit of this disclosure.

In one or more embodiments, when a multi-handed touch input is detected, in response to a user pressing a shutter "button," one or more processors cause the image capture device to capture an increased number of image frames for a frame stacking process. For instance, in a "night mode" of operation, the one or more processors may cause the image capture device to capture thirty or more frames when being supported by the multi-handed touch input.

By contrast, when a single-handed touch input is detected, the one or more processors cause the image capture device to capture a reduced number of frames. For example, the one or more processors may cause the image capture device to capture only three to six image frames for a frame stacking process when operating in the night mode of operation and being supported by the single-handed touch input.

Thus, in one or more embodiments an electronic device includes a user interface receiving user input initiating an image capture operation by an image capture device of the electronic device. The electronic device also includes a light sensor determining whether the electronic device is situated within a low-light environment. One or more touch sensors determine whether one or more of a device housing of the electronic device and/or a display of the electronic device is receiving one of multi-handed touch input or single-handed touch input.

Thereafter, one or more processors cause the image capture device to one of: (1) capture a first quantity of images in response to the user input when the light sensor determines the electronic device is situated within an environment other than the low-light environment; (2) capture a second quantity of images in response to the user input when the light sensor determines the electronic device is situated within the low-light environment and the one or more of the device housing of the electronic device and/or the display of the electronic device is receiving the single-handed touch input; and (3) capture a third quantity of images in response to the user input when the light sensor determines the electronic device is situated within the low-light environment and the one or more of the device housing of the electronic device and/or the display of the electronic device is receiving the multi-handed touch input.

In one or more embodiments the second quantity of images is greater than the first quantity of images and the third quantity of images is greater than the second quantity of images. Advantageously, embodiments of the disclosure combine grip detection and dynamic fame stacking with the determination of how many frames to feed the frame stacking process being based upon whether a user is holding the electronic device with a multi-handed touch input or a single-handed touch input.

Turning now to FIG. 1, illustrated therein is one explanatory method 100 and system 108 in accordance with one or more embodiments of the disclosure. Beginning at step 101, a user 109 is directing an image capture device (located on the rear side) of an electronic device 110 toward a subject 111. The user 109 is also delivering user input 112 initiating an image capture operation causing the image capture device to capture an image 113 of the subject 111. In this illustrative embodiment, the user input 112 comprises the user 109 touching a physical button situated on the electronic device 110. In other embodiments, the user input 112 might comprise the user delivering touch input to a user actuation target or other icon presented on the display 114 of the electronic device 110. Other options for delivering user input 112 to the electronic device 110 to initiate the image capture operation will be obvious to those of ordinary skill in the art having the benefit of this disclosure. The user input 112 is received at step 102.

In one or more embodiments, the electronic device 110 is equipped with a light sensor. In one or more embodiments, the light sensor can detect lighting conditions within an environment of the electronic device, changes in light levels or optical intensities, as well as changes in color, light, or shadow. This information can assist one or more processors of the electronic device in configuring the settings for the image capture device when capturing one or more images.

At optional step 103, the light sensor senses a lighting condition within an environment of the electronic device 110. In one or more embodiments, step 103 comprises determining whether the lighting condition within the environment of the electronic device 110 is a low-light environment. In one or more embodiments, a low-light condition occurs when there is a light density of less than one hundred lux within the environment of the electronic device 110. While this is one explanatory threshold indicative of a low-light condition, others will be obvious to those of ordinary skill in the art having the benefit of this disclosure.

In one or more embodiments the electronic device 110 is equipped with one or more touch sensors. These touch sensors can take a variety of forms. Illustrating by example, in one embodiment the display 114, which can be touch-sensitive, serves as a touch sensor by detecting when a hand or finger is touching its surface. In other embodiments, the touch sensors can include a capacitive touch sensor, an infrared touch sensor, resistive touch sensors, inductive touch sensors, or another touch-sensitive technology. The touch sensors can comprise force sensors and/or pressure sensors as well.

In one or more embodiments, the front-facing imager 115 can even serve as a touch sensor. When the field of view of the front-facing imager 115 is blocked, occluded, or obscured by an object proximately located with the electronic device, this can indicate that the user 109 is holding the end of the electronic device 110 on which the front-facing imager 115 is situated. Illustrating by example, in FIG. 1 the front-facing imager 115 is situated on the left side of the electronic device 110 as it is being held in landscape mode. The physical button is located on the opposite side of the electronic device 110. If the user were using a two-handed grip at step 101, rather than the one-handed grip shown, the user 109 would likely hold the left side of the electronic device 110 so that the display 114 could be seen between the two hands. This would obscure the field of view of the front-facing imager 115. Accordingly, the front-facing imager 115 can function as a touch sensor in addition to capturing images in one or more embodiments.

Figure 4:
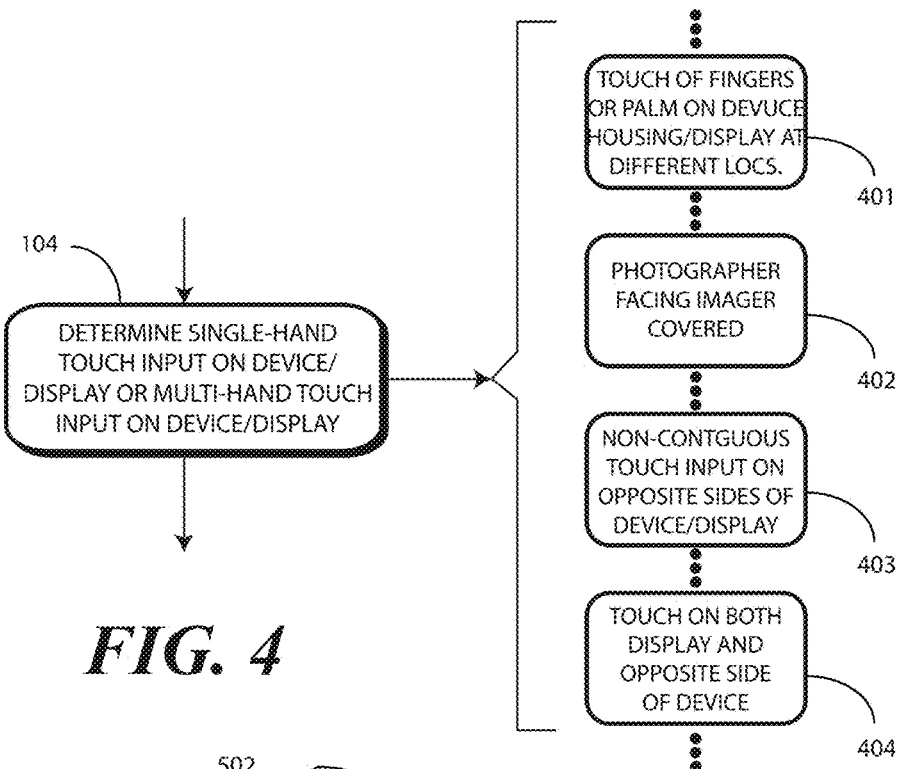
FIG. 4 illustrates one or more explanatory options for determining whether touch input is multi-handed touch input or single-handed touch input in accordance with one or more embodiments of the disclosure.

At step 104, the one or more touch sensors determine whether the electronic device 110 is receiving a single-handed touch input or a multi-handed touch input. Said differently, at step 104 the one or more touch sensors determine whether the electronic device 110 is being supported by a single hand, as shown at step 101, or by two hands, as will be shown below with reference to FIG. 2. This determination can be made in a variety of ways. Turning briefly to FIG. 4, illustrated therein are a few examples.

In one or more embodiments, a multi-handed touch input is detected at step 104 when the one or more touch sensors detect, at stage 401, a first touch input at a first location and a second touch input at a second location. In other embodiments, touch input must be received on opposite sides of the display (114) for the multi-handed touch input indication. In one or more embodiments, a multi-handed touch input is detected at step 104 when the one or more touch sensors detect, at stage 403, a first touch input at a first location and a second touch input at a second location that is separated from the first location by the display (114). Said differently, if the user (109) were touching the electronic device (110) on the left side of the display (114) and the right side of the display (114), in one or more embodiments this would be construed by one or more processors of the electronic device (110) as a multi-handed touch input.

In other embodiments, a multi-handed touch input is detected at step 104 when, at stage 404, touch input is received on two sides of the electronic device (110). In the illustrative embodiment of FIG. 1, the display (114) is positioned on a first major surface of the electronic device (110), which is the major surface defined by the surfaces of the first device housing and second device housing facing the user. The rear-facing imager is then positioned on a second side of the electronic device (110), which is the major surface facing the subject (111). In one or more embodiments, when the electronic device (110) comprises a display (114) positioned on a first major surface of the electronic device, step 104 results in a multi-handed touch input being detected, at stage 404, when the one or more touch sensors detect a first touch input on the display (114) and a second touch input on the second major surface of the electronic device (110).

As noted above, the front-facing imager (115) can be used as a touch sensor as well. In the illustrative embodiment of FIG. 1, the front-facing imager (115) and display are situated on the same major surface of the electronic device (110), i.e., the major surface defined by the first device housing and the second device housing that are facing the user (109). The image capture device that will capture the image of the subject (111) is situated on the second major surface of the electronic device (110). In one or more embodiments, at step 104 one or more processors of the electronic device (110) cause the front-facing imager (115) to check, at stage 402, its field of view for obscuration, blockage, occlusion, or covering. In one or more embodiments, step 104 will indicate that the electronic device (110) is being supported by the multi-handed touch input when, at stage 402, the field of view of the front-facing imager (115) is obscured by an object proximately located with the electronic device (110). Note that this process can be reversed when the front-facing imager (115) is being used to capture a "selfie," as the user (109) may obscure the field of view of the rear-facing imager when using the multi-handed touch input as well.

Turning now back to FIG. 1, in one or more embodiments the electronic device 110 also includes a motion detector. The motion detector can determine an orientation and/or movement of the electronic device 110 in three-dimensional space. Illustrating by example, the motion detector can include an accelerometer, gyroscopes, or other device to detect device orientation and/or motion of the electronic device 110. Using an accelerometer as an example, an accelerometer can be included to detect motion of the electronic device 110. Additionally, the accelerometer can be used to sense some of the gestures of the user, such as one talking with their hands, running, or walking.

In one or more embodiments, the motion detector can determine the spatial orientation of an electronic device 110 in three-dimensional space by, for example, detecting a gravitational direction. In addition to, or instead of, an accelerometer, an electronic compass can be included to detect the spatial orientation of the electronic device 110 relative to the earth's magnetic field. Similarly, one or more gyroscopes can be included to detect rotational orientation of the electronic device 110.

At optional step 105, the motion detector can determine an amount of motion the electronic device 110 is experiencing in three-dimensional space. As will be described in more detail below, in one or more embodiments the one or more processors of the electronic device 110 cause the image capture device to capture multiple images of the subject 110 in response to the user input 112 requesting that a single image be captured. This can be done for a variety of reasons, including so as to allow the one or more processors to select the image with the highest image quality, to allow for a frame stacking process to occur, or to allow for other post-processing operations. In one or more embodiments, optional step 105 comprises detecting, with the motion sensor, a stability indication of the electronic device 110 in response to the user input 112 initiating the image capture operation to determine whether the stability indication is above, or below, a predefined threshold.

At step 106, the one or more processors of the electronic device 110 cause the image capture device to capture a plurality of images of the subject 111 in response to the user input 112 requesting a single image of the subject 111 be captured. In one or more embodiments, in response to the user input 112 initiating the image capture operation, the image capture device captures multiple images for delivery to a frame stacking process.

In a frame stacking process, two or more image frames are combined into a single image having a higher dynamic range or other image quality characteristic than either image alone. Alternatively, one image frame having optimal image quality can be selected from the multiple image frames captured in response to the user input 112 initiating the image capture operation.

In many instances, frame stacking involves combining frames of two or more exposure lengths into a single image to achieve a higher dynamic range. Illustrating by example, a number of frames corresponding to a shorter exposure frame length may be selected, thereafter using motion-compensated frame stacking to improve the fidelity of the frame and reduce the noise in the frame prior to combining the shorter exposure length frame with one or more longer exposure length frame frames. This combination of multiple image frames can result in reduced motion blur in images made from combined frames.

Combining frames in a frame stacking process can reduce the signal-to-noise ratio in the resulting image as well. Illustrating by example, a single image may be characterized by a first signal-to-noise characteristic, while a second single image is characterized by a different signal-to-noise characteristic, and so forth. For a particular sensor of an image capture device, there may be a limit as to the maximum signal-to-noise ratio that can be achieved. This limit generally occurs when the sensor reaches its well capacity. Longer exposure length images may allow the sensor to reach well capacity, while shorter exposure length images may include less blur but also a lower signal-to-noise ratio.

Accordingly, using a frame stacking process image frames with a shorter exposure may be captured more than once. Illustrating by example, at step 106 the image capture device of the electronic device 110 may capture multiple frames having a shorter exposure time and one frame having a longer exposure time. These multiple shorter frames may then be combined with each other prior to being combined with longer frame using a motion compensation frame stacking technique to reduce motion blur. The resulting frame may be combined with the longer frame to then increase the signal-to-noise ratio. This process creates a single, high-fidelity, high-dynamic range frame.

In accordance with embodiments of the disclosure, the number of images captured at step 106 is selected as a function of whether the electronic device 110 is being supported by a single-handed touch input or a multi-handed touch input. The number of images captured at step 106 can also be a function of the lighting level within the environment of the electronic device 110, when step 103 is included in the method 100, and can be a function of the stability indication when step 105 is included in the method.

Illustrating by example, in one or more embodiments step 106 comprises capturing a first plurality of images when the one or more touch sensors detect a multi-handed touch input. However, when the one or more touch sensors detect a single-handed touch input, step 106 comprises capturing a second plurality of images that is fewer than the number of images in the first plurality of images. In one or more embodiments, the greater number of images in the first plurality of images is at least two times the number of images in the second plurality of images.

In the illustrative embodiment of FIG. 1, the electronic device 110 is being supported by a single-handed touch input as shown at step 107. Accordingly, at step 106 one or more processors of the electronic device 110 cause, in response to the user interface of the electronic device 110 receiving the user input 112 initiating the image capture operation, the image capture device to capture a first plurality of images 116 of the subject 111. In one or more embodiments, the first plurality of images 116 comprises between three and six images. However, this range is illustrative only, as other numbers of images will be obvious to those of ordinary skill in the art having the benefit of this disclosure.

Figure 2:
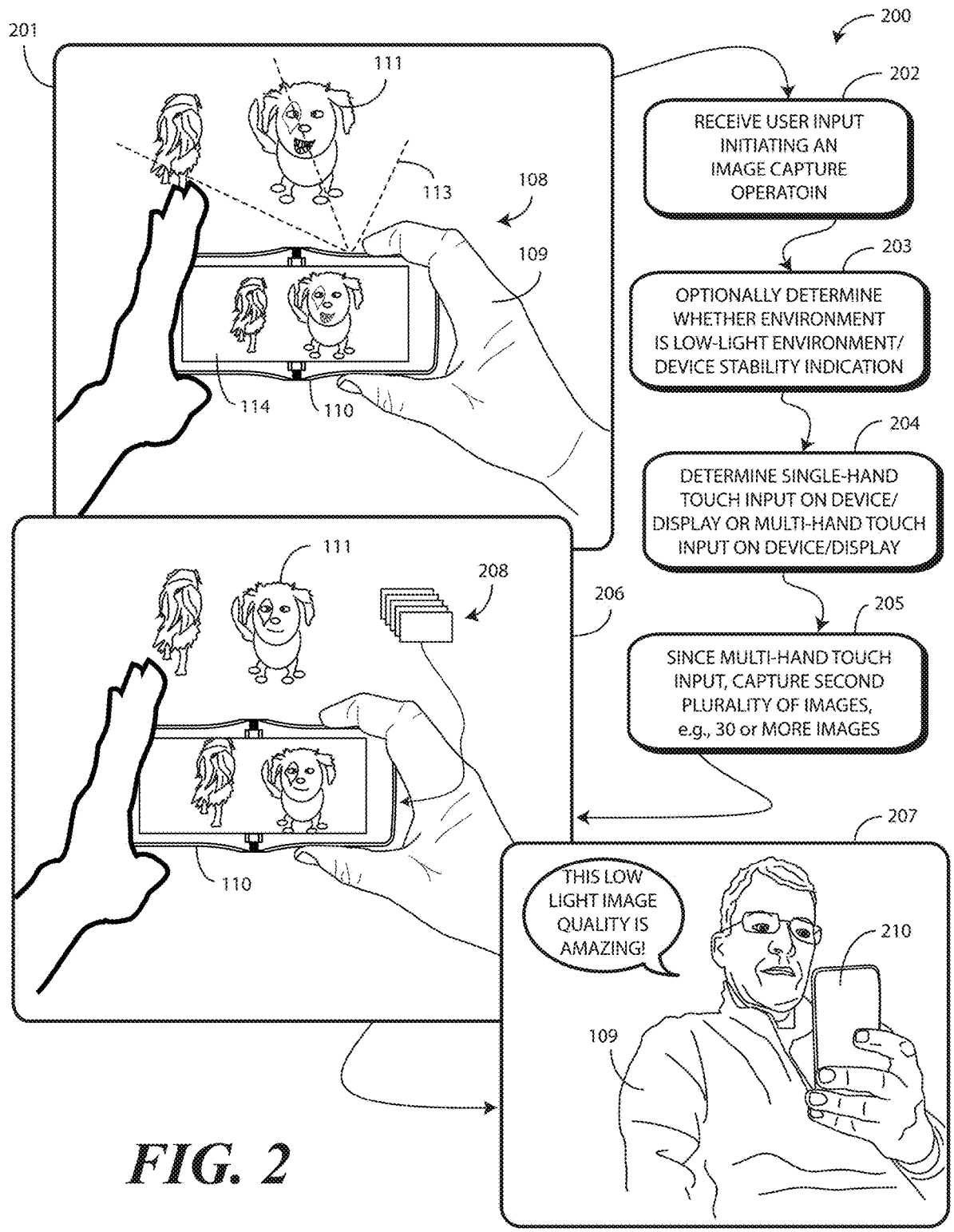
FIG. 2 illustrated therein is another explanatory method and system in accordance with one or more embodiments of the disclosure.

Turning now to FIG. 2, illustrated therein is another method 200 and system 108 in accordance with one or more embodiments of the disclosure. The method 200 of FIG. 2 is similar to the method (100) of FIG. 1. However, rather than being supported by the single-handed touch input, in FIG. 2 the electronic device 110 is being supported by a multi-handed touch input as shown at step 201.

Beginning at step 201, a user 109 is again directing an image capture device (located on the rear side) of an electronic device 110 toward a subject 111. The user 109 has already delivered (in similar fashion to that described above with reference to step (101)) user input (112) initiating an image capture operation causing the image capture device to capture an image 113 of the subject 111. The user input (112) is received at step 202.

At optional step 203, the light sensor of the electronic device 110 senses a lighting condition within an environment of the electronic device 110. In one or more embodiments, step 103 comprises determining whether the lighting condition within the environment of the electronic device 110 is a low-light environment, which may occur when there is a light density of less than one hundred lux within the environment of the electronic device 110.

At step 204, the one or more touch sensors determine whether the electronic device 110 is receiving a single-handed touch input or a multi-handed touch input. Said differently, at step 204 the one or more touch sensors determine whether the electronic device 110 is being supported by a single hand, as was shown above at step (101), or by two hands, as shown at step 201.

As noted above, this determination can be made in a variety of ways. In one or more embodiments, a multi-handed touch input is detected at step 204 when the one or more touch sensors detect a first touch input at a first location and a second touch input at a second location that is separated from the first location by the display 114. This is occurring in step 201. Said differently, at step 201 the user 109 is touching the electronic device 110 on the left side of the display 114 and the right side of the display 114. Accordingly, step 204 returns an indication of multi-handed touch input.

In other embodiments, a multi-handed touch input is detected at step 204 when touch input is received on two sides of the electronic device 110. In one or more embodiments, when the electronic device 110 comprises a display 114 positioned on a first major surface of the electronic device, step 204 results in a multi-handed touch input being detected when the one or more touch sensors detect a first touch input on the display 114 and a second touch input on the second major surface of the electronic device 110.

As shown at step 201, the user's left hand is obscuring the front-facing imager (115). Accordingly, the front-facing imager (115) can be used as a touch sensor or to confirm that touch input is occurring. In one or more embodiments, at step 204 one or more processors of the electronic device 110 cause the front-facing imager (115) to check its field of view for obscuration, blockage, occlusion, or covering. This is occurring at step 201. Accordingly, step 204 will indicate that the electronic device 110 is being supported by the multi-handed touch input due to the fact the field of view of the front-facing imager (115) is obscured by an object proximately located with the electronic device 110, which is the user's left hand in this example. Again, it should be noted that this process can be reversed when the front-facing imager (115) is being used to capture a "selfie," as the user 109 may obscure the field of view of the rear-facing imager when using the multi-handed touch input as well.

At step 205, the one or more processors of the electronic device 110 cause the image capture device to capture a plurality of images of the subject 111 in response to the user input 112 requesting a single image of the subject 111 be captured. In one or more embodiments, in response to the user input 112 initiating the image capture operation, the image capture device captures multiple images for delivery to a frame stacking process or a frame selection process.

In accordance with embodiments of the disclosure, the number of images captured at step 205 is selected as a function of whether the electronic device 110 is being supported by a single-handed touch input or a multi-handed touch input. The number of images captured at step 205 can also be a function of the lighting level within the environment of the electronic device 110, when step 203 is included in the method 200. The number of images can be affected by the stability indication when step (105), previously described above with reference to FIG. 1, is included in the method 200.

As described above, in one or more embodiments step 205 comprises capturing a first plurality of images when the one or more touch sensors detect a multi-handed touch input. However, when the one or more touch sensors detect a single-handed touch input, step 205 comprises capturing a second plurality of images. The first plurality of images includes a greater number of images than the second plurality of images. In one or more embodiments, the greater number of images in the first plurality of images is at least two times the number of images in the second plurality of images.

In the illustrative embodiment of FIG. 2, the electronic device 110 is being supported by a multi-handed touch input as shown at step 206. Accordingly, at step 205 one or more processors of the electronic device 110 cause, in response to the user interface of the electronic device 110 receiving the user input (112) initiating the image capture operation, the image capture device to capture a first plurality of images 208 of the subject 111. In one or more embodiments, the first plurality of images 208 comprises more than thirty images. However, this threshold is illustrative only, as other numbers of images will be obvious to those of ordinary skill in the art having the benefit of this disclosure.

In addition to the determination of whether the electronic device 110 is being supported by the single-handed touch input or the multi-handed touch input, other factors can affect the multi-image capture operation and/or the number of image frames that are captured in response to user input (112) initiating an image capture operation requesting a single image of a subject. Illustrating by example, in one or more embodiments the one or more processors of the electronic device cause the image capture device to capture the first plurality of images 208 when the one or more touch sensors detect the multi-handed touch input while the user input (112) initiating the image capture operation is received. Such would be the case in the illustrative example of FIG. 2 if, for example, the user's hands were positioned as shown at step 201 and the user 109 used the right thumb to deliver the user input (112) received at step 202.

Where optional step 203 is included, step 205 may comprise the one or more processors of the electronic device 110 causing the image capture device to capture the first plurality of images 208 only when the one or more touch sensors detect the multi-handed touch input concurrently with the light sensor detecting the low-light condition within the environment of the electronic device 110. Accordingly, if step 203 concludes that the light density in the environment of the electronic device 110 is less than one hundred lux when step 204 determines the electronic device 110 is being supported by the multi-handed touch input, step 205 would comprise the one or more processors causing the image capture device to capture the second plurality of images 208 in response to the user input (112) received at step 202. In one or more embodiments, a low-light condition is a condition precedent for capturing the second plurality of images 208, with the same occurring only when both the low-light condition and the multi-handed touch input occur.

Where a motion detector is included and step (105) from FIG. 1 is included between step 204 and step 205 of the method 200 of FIG. 2, the stability indication can be used to alter the number of images included in either the first plurality of images (116) or the second plurality of images 208. Illustrating by example, when step (105) from FIG. 1 is included and the stability indication of the electronic device 110 is less than a predefined threshold, the number of images in the first plurality of images 208 can be increased. Said differently, when the stability indication of the electronic device 110 is below a predefined threshold, in one or more embodiments the difference in the number of images in the first plurality of images (116) and the second plurality of images 208 increases.

Since the first plurality of images 208 can be fed into a frame stacking process, as noted above this reduces blur, increases image quality, and increases the signal-to-noise ratio of the resulting image. Thus, when the user 109 views the final image, even on a device having a higher image resolution presentation capability such as the tablet computer 210 of step 207, they can be presented with a resolution suitable for this resolution presentation capability due to the fact that the first plurality of images 208 were processed by the frame stacking operation to achieve a much higher image quality level, even in low-light conditions or when the stability indication of the electronic device 110 is less than the predefined threshold. As shown at step 207, the user 109 thinks the quality of the image is incredible, despite the fact that he perceived the image being caught in a low-light environment. In effect, the selection of the number of images to capture as a function of whether the electronic device 110 was being supported by a single-handed touch input or a multi-handed touch input allows for resulting images to be true high-definition images without any visual distortion, blur, or other artifacts. All the user 109 had to do was hold the electronic device 110, actuate the image capture device, and direct its field of view toward the subject 111. The selection of whether to capture the second plurality of images 208 or the first plurality of images (116) ensured that the resulting image would be of superior quality, even in low-light conditions, all while minimizing processing power and image processing time.

Figure 3:
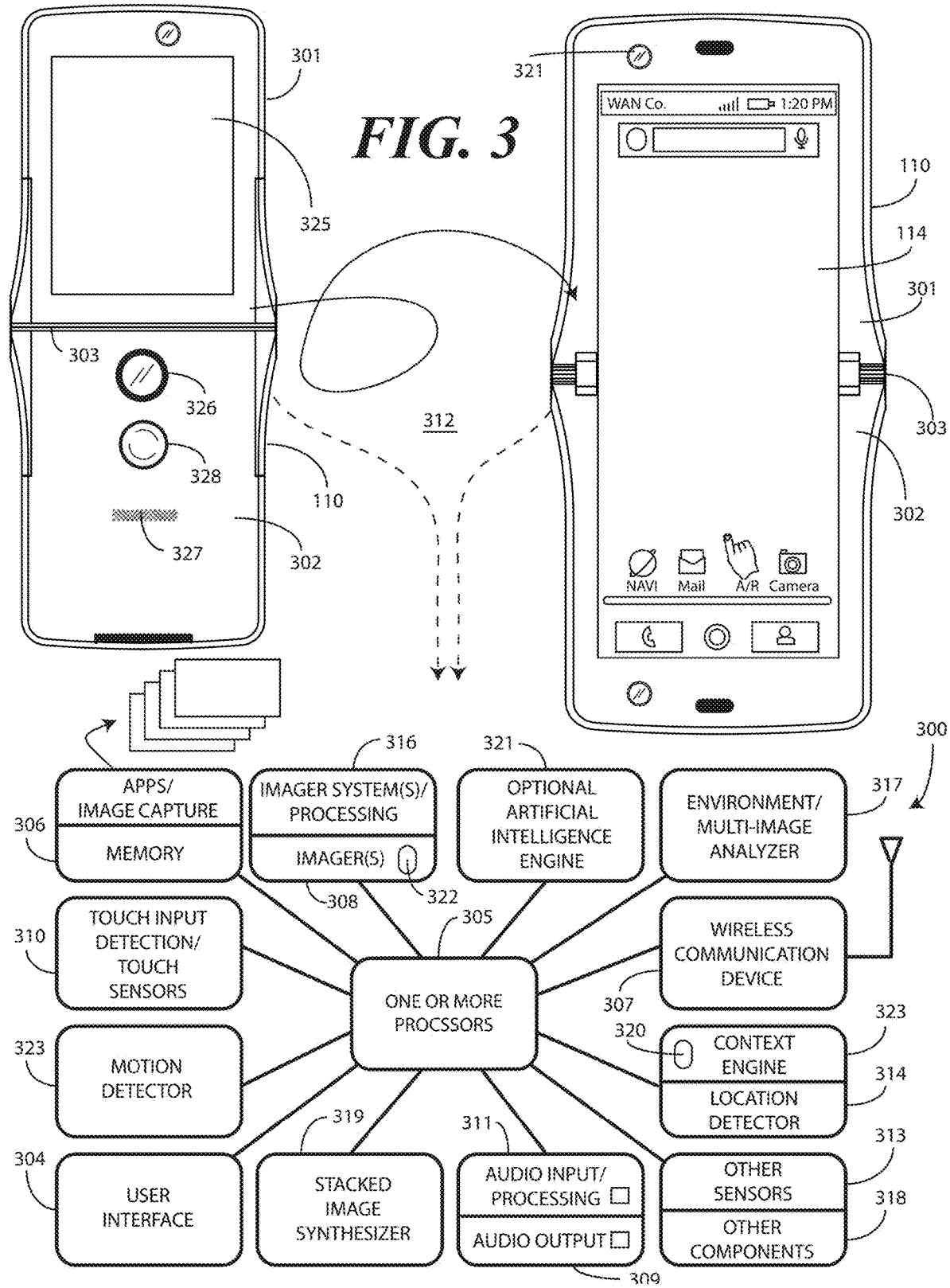
FIG. 3 illustrates one explanatory electronic device in accordance with one or more embodiments of the disclosure.

Turning now to FIG. 3, illustrated therein are more details of one explanatory electronic device 110 configured in accordance with one or more embodiments of the disclosure. While illustrated as a hinged electronic device, the electronic device 110 could include a singular housing that is not deformable and has no hinge, configured in a traditional "candy bar" form factor as well. Where configured as a candy bar, the display 114 of electronic device 110 would remain exposed and accessible. By contrast, where configured as a hinged device having a first device housing 301 that is selectively pivotable about a hinge 303 relative to the second device housing 302 between a closed position and an axially displaced open position, the display 114 of the electronic device 110 can be selectively concealed and revealed, depending upon whether the electronic device is in the closed position or the axially displaced open position.

The electronic device 110 of FIG. 3 is configured as a portable electronic device, and for illustrative purposes is configured as a smartphone. However, the electronic device 110 could be configured in other ways as well. For example, the electronic device 110 could be configured as a tablet computer, a gaming device, a multimedia player, and so forth. Still other types of electronic devices can be configured in accordance with one or more embodiments of the disclosure as will be readily appreciated by those of ordinary skill in the art having the benefit of this disclosure.

The illustrative electronic device 110 of FIG. 3 includes multiple displays 114, 325. A secondary display 325, which can be coupled to either of the first device housing 301 or the second device housing 302, is coupled to the first device housing 301 in this embodiment. This display 325 is considered to be an "exterior" display due to the fact that it is exposed when the first device housing 301 and the second device housing 302 are in the closed position.

The primary display, i.e., display 114, can also be coupled to either or both of the first device housing 301 or the second device housing 302. In this illustrative embodiment, the display 114 is coupled to both the first device housing 301 and the second device housing 302 and spans the hinge 303. In other embodiments, this display 114 can be replaced by two displays, with one coupled to the first device housing 301 and another coupled to the second device housing 302. In either case, this display 114 is considered to be an "interior" display because it is concealed when the first device housing 301 and the second device housing 302 are in the closed position. Either or both of display 114 and/or display 325 can be touch sensitive.

Features can be incorporated into the first device housing 301 and/or the second device housing 302. Examples of such features include an optional camera 326, which was used as the image capture device in the methods (100, 200) of FIGS. 1-2, or an optional speaker port 327. Each is shown disposed on the rear side of the electronic device 110 in FIG. 3, but image capture devices could be placed on the front side instead of, or in addition to, camera 326 as well. Illustrating by example, in this illustrative embodiment at least one image capture device 308 is positioned on the front side of the electronic device 110 as well. In this illustrative embodiment, an optional user interface component 328, which may be a button or touch sensitive surface, can also be disposed along the rear side of the second device housing 302.

Also illustrated in FIG. 3 is one explanatory block diagram schematic 300 of one or more components suitable for inclusion the electronic device 110. In one or more embodiments, the block diagram schematic 300 is configured as a printed circuit board assembly disposed within the first device housing 301 and/or second device housing 302 of electronic device 110. Various components can be electrically coupled together by conductors or a bus disposed along one or more printed circuit boards. It should be noted that the block diagram schematic 300 includes many components that are optional, but which are included in an effort to demonstrate how varied electronic devices configured in accordance with embodiments of the disclosure can be.

Thus, it is to be understood that the block diagram schematic 300 of FIG. 3 is provided for illustrative purposes only and for illustrating components of one electronic device 110 in accordance with embodiments of the disclosure. The block diagram schematic 300 of FIG. 3 is not intended to be a complete schematic diagram of the various components required for an electronic device 110. Therefore, other electronic devices in accordance with embodiments of the disclosure may include various other components not shown in FIG. 3 or may include a combination of two or more components or a division of a particular component into two or more separate components, and still be within the scope of the present disclosure.

The illustrative block diagram schematic 300 of FIG. 3 includes many different components. Embodiments of the disclosure contemplate that the number and arrangement of such components can change depending on the particular application. Accordingly, electronic devices configured in accordance with embodiments of the disclosure can include some components that are not shown in FIG. 3, and other components that are shown may not be needed and can therefore be omitted.

The illustrative block diagram schematic 300 includes a user interface 304. In one or more embodiments, the user interface 304 includes the display 114, which may optionally be touch sensitive. In one embodiment, users can deliver user input to the display 114 by delivering touch input from a finger, stylus, or other objects disposed proximately with the display 114.

For electronic device 110, since the display 114 spans the hinge 303, it is configured to be flexible. For instance, in one embodiment this display 114 is configured as an organic light emitting diode (OLED) display fabricated on a flexible plastic substrate. This allows the display 114 to be flexible so as to deform when the first device housing 301 pivots about the hinge 303 relative to the second device housing 302. However, it should be noted that other types of displays would be obvious to those of ordinary skill in the art having the benefit of this disclosure. In other embodiments conventional, rigid displays can be disposed to either side of the hinge 303 rather than using a flexible display.

In one embodiment, the display 114 is configured as an active-matrix organic light emitting diode (AMOLED) display. However, it should be noted that other types of displays, including liquid crystal displays, would be obvious to those of ordinary skill in the art having the benefit of this disclosure.

In one embodiment, the electronic device 110 includes one or more processors 305. In one embodiment, the one or more processors 305 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 300. Each of the application processor and the auxiliary processor(s) can be configured to process and execute executable software code to perform the various functions of the electronic device 110 with which the block diagram schematic 300 operates. A storage device, such as memory 306, can optionally store the executable software code used by the one or more processors 305 during operation.

In this illustrative embodiment, the block diagram schematic 300 also includes a communication device 307 that can be configured for wired or wireless communication with one or more other devices or networks. The networks can include a wide area network, a local area network, and/or personal area network. The communication device 307 may also utilize wireless technology for communication, such as, but are not limited to, peer-to-peer or ad hoc communications such as HomeRF, Bluetooth and IEEE 802.11, and other forms of wireless communication such as infrared technology. The communication device 307 can include wireless communication circuitry, one of a receiver, a transmitter, or transceiver, and one or more antennas.

In one embodiment, the one or more processors 305 can be responsible for performing the primary functions of the electronic device with which the block diagram schematic 300 is operational. For example, in one embodiment the one or more processors 305 comprise one or more circuits operable with the user interface 304 to present presentation information to a user. This information can include images captured by one or more image capture devices 308 of the electronic device 110. Additionally, the one or more processors 305 can be operable with an audio output device 309 to deliver audio output to a user. The executable software code used by the one or more processors 305 can be configured as one or more modules that are operable with the one or more processors 305. Such modules can store instructions, control algorithms, and so forth.

In one or more embodiments, the block diagram schematic 300 includes an audio input/processor 311. The audio input/processor 311 can include hardware, executable code, and speech monitor executable code in one embodiment. The audio input/processor 311 can include, stored in memory 306, basic speech models, trained speech models, or other modules that are used by the audio input/processor 311 to receive and identify voice commands that are received with audio input captured by an audio input device. In one embodiment, the audio input/processor 311 can include a voice recognition engine. Regardless of the specific implementation utilized in the various embodiments, the audio input/processor 311 can access various speech models to identify speech commands in one or more embodiments.

The audio input/processor 311 is operable as an audio capture device to receive and capture audio input from a source, such as a person, authorized user, plurality of persons within an environment 312 about the electronic device 110. The audio input/processor 311 can include hardware, executable code, and speech monitor executable code in one embodiment. The audio input/processor 311 can be operable with one or more predefined authentication references stored in memory 306. In one or more embodiments, the audio input/processor 311 can receive and identify voice commands that are received with audio input captured by an audio input device. In one embodiment, the audio input/processor 311 can include a voice recognition engine. Regardless of the specific implementation utilized in the various embodiments, the audio input/processor 311 can access various speech models stored with the predefined authentication references to identify speech commands.

In one embodiment, the audio input/processor 311 is configured to implement a voice control feature that allows the electronic device 110 to function as a voice assistant device, which may be configured as a voice assistant engine. In one or more embodiments, the voice assistant engine is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can cause the emanation of the audio input from their mouth to cause the one or more processors 305 of the electronic device 110 to execute a control operation.

Various sensors 313 can be operable with the one or more processors 305. A first example of a sensor that can be included with the various sensors 313 is a touch sensor 310. The electronic device 110 can include one or more touch sensors, each of which can include a capacitive touch sensor, an infrared touch sensor, resistive touch sensors, or another touch-sensitive technology.

Another example of a sensor 313 is a geo-locator that serves as a location detector 314. In one embodiment, location detector 314 is able to determine location data of the electronic device 110. Location can be determined by capturing the location data from a constellation of one or more earth orbiting satellites, or from a network of terrestrial base stations to determine an approximate location. The location detector 314 may also be able to determine location by locating or triangulating terrestrial base stations of a traditional cellular network, such as a CDMA network or GSM network, or from other local area networks, such as Wi-Fi networks.

Another example of a sensor 313 suitable for inclusion with the electronic device 110 include one or more motion sensors 323 that are operable to determine an orientation and/or movement of the electronic device 110 in three-dimensional space. Illustrating by example, the one or more motion sensors 323 can include an accelerometer, gyroscopes, or other device to detect device orientation and/or motion of the electronic device 110.

Another example of a sensor 313 is a force sensor. Where included, the force sensor can take various forms. For example, in one embodiment, the force sensor comprises resistive switches or a force switch array configured to detect contact with either the display or the housing of an electronic device. In another embodiment, the force sensor can be capacitive. In yet another embodiment, piezoelectric sensors can be configured to sense force as well.

An image processing system 316 can be included in the electronic device 110 and can be operable with the one or more processors 305. The image processing system 316 can be operable with one or more image capture devices 308. The one or more image capture devices 308 can comprise one or more of a conventional image capture device, such as camera 326, a depth image capture device, and, optionally, one or more proximity sensors.

In one embodiment, the one or more image capture devices 308 comprise a two-dimensional image capture device, such as that illustrated by camera 326. In one or more embodiments, the camera 326 comprises a two-dimensional Red-Green-Blue (RGB) image capture device. The one or more image capture devices 308 can also include an infrared image capture device. Other types of image capture devices suitable for inclusion with the one or more image capture devices 308 will be obvious to those of ordinary skill in the art having the benefit of this disclosure.

In one or more embodiments, the image processing system 316 can be operable with an environmental analyzer 317. The environmental analyzer 317 can be configured to process an image or depth scan of an object and determine whether the object matches predetermined criteria by comparing the image or depth scan to one or more predefined authentication references stored in memory 306. Working in conjunction with the environmental analyzer 317, in one or more embodiments the image processing system 316 can be configured to identify non-standard lighting conditions, including low-light conditions or unbalanced ambient light levels such as may occur when sun is shining through a window into a dark room. Beneficially, this optical recognition performed by the image processing system 316 operating in conjunction with the environmental analyzer 317 allows the number of image frames included with a first plurality of images captured when the electronic device 110 is being supported by multi-handed touch input or a second plurality of images when the electronic device 110 is being supported by single-handed touch input as previously described.

Other components 318 operable with the one or more processors 305 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers, the ultrasound transducers (where included), or other alarms and/or buzzers. The other components 318 can also include a mechanical output component such as vibrating or motion-based mechanisms.

The other components 318 can optionally include a barometer operable to sense changes in air pressure due to elevation changes or differing pressures of the electronic device 110. The other components 318 can also optionally include a light sensor 320 that detects changes in optical intensity, color, light, or shadow. In one or more embodiments, the light sensor 320 is operable to determine whether the environment 312 of the electronic device 110 is a low-light environment, one example of which occurs when the light density within the environment 312 is less than one hundred lux.

In one or more embodiments, the one or more processors 305 can define one or more process engines. Examples of these process engines include a stacked image synthesizer/selector 319, an artificial intelligence engine 321, an image quality analyzer 322, and a context engine 323. Each engine can be a component of the one or more processors 305, operable with the one or more processors 305, defined by the one or more processors 305, and/or integrated into the one or more processors 305. Other configurations for these engines, including as software or firmware modules operable on the one or more processors 305, will be obvious to those of ordinary skill in the art having the benefit of this disclosure.

For instance, a context engine 323 can be operable with the various sensors to detect, infer, capture, and otherwise detect external conditions occurring within the environment 312 of the electronic device 110. For example, where included one embodiment of the context engine 323 determines assessed contexts and frameworks using adjustable algorithms of context assessment employing information, data, and events. These assessments may be learned through repetitive data analysis. Alternatively, a user may employ the user interface 304 to enter various parameters, constructs, rules, and/or paradigms that instruct or otherwise guide the context engine 323 in detecting, for example, when the electronic device 110 is being supported by a multi-handed touch input or a single-handed touch input and other contextual information. The context engine 323 can comprise an artificial neural network or other similar technology in one or more embodiments.

The stacked image synthesizer/selector 319 can perform a frame stacking operation to optimize image quality, reduce image blur, increase the signal-to-noise ratio, or preform other operations. The stacked image synthesizer/selector 319 can also perform a selection of a best image from a plurality of images captured by the one or more image capture devices 308. The stacked image synthesizer/selector 319 can optionally operate in conjunction with the artificial intelligence engine 321 to perform image optimization as well. Alternatively, the stacked image synthesizer/selector 319 can operate in conjunction with the image processing system 316 to perform the automatic image optimization and/or post-processing operations as well.

In one or more embodiments, the stacked image synthesizer/selector 319 synthesize the images captured by the at least one image capture devices 308 to form a composite image when the light sensor 320 determines the electronic device 110 is situated within a low-light environment and the device housing of the electronic device 110 defined by the first device housing 301 and the second device housing 302 and/or the display 114 of the electronic device 110 is receiving multi-handed touch input. The stacked image synthesizer/selector 319 can perform a similar operation when another quantity of images is captured in the low-light environment when the electronic device 110 is being supported by the single-handed touch input as well.

The image quality analyzer 322 can be configured to determine what image quality level exists when, for example, the one or more image capture devices 308 capture a first plurality of images when the electronic device 110 is being supported by the multi-handed touch input or the second plurality of images when the electronic device 110 is being supported by the single-handed touch input. For example, if the one or more image capture devices 308 are simply in the viewfinder mode with their captured image frame stream being only presented on the display 114 of the electronic device 110, the image quality analyzer 322 may function to determine whether the environment 312 is experiencing a low-light condition or an unbalanced ambient light condition, and so forth.

In one or more embodiments, each of the stacked image synthesizer/selector 319, the artificial intelligence engine 321, the image quality analyzer 322, and the context engine 323 is operable with the one or more processors 305. In some embodiments, the one or more processors 305 can control the stacked image synthesizer/selector 319, the artificial intelligence engine 321, the image quality analyzer 322, and the context engine 323. In other embodiments, each of the stacked image synthesizer/selector 319, the artificial intelligence engine 321, the image quality analyzer 322, and the context engine 323 can operate independently, delivering information to the one or more processors 305. The stacked image synthesizer/selector 319, the artificial intelligence engine 321, the image quality analyzer 322, and the context engine 323 can each receive data from the various sensors 313. In one or more embodiments, the one or more processors 305 are configured to perform the operations of the stacked image synthesizer/selector 319, the artificial intelligence engine 321, the image quality analyzer 322, and the context engine 323.

When executing operations such as those method steps described above with reference to FIGS. 1 and 2, in one or more embodiments the one or more image capture devices 308 capture one or more images as a function of whether the electronic device 110 is supported by a multi-handed touch input or a single-handed touch input, with the former situation capturing more images than the latter. In one or more embodiments, the number of images captured in response to the one or more touch sensors 310 detecting the multi-handed touch input or the single-handed touch input can be affected by the lighting conditions detected by the light sensor 320 and/or motion detected by the motion sensor 323.

Accordingly, as shown in FIG. 3, in one or more embodiments the electronic device 110 includes a user interface 304 receiving user input initiating an image capture operation by an image capture device, one example of which is camera 326. A light sensor 320 determines whether the electronic device 110 is situated within an environment 312 that is experiencing a low-light condition.

One or more touch sensors 310 determine whether one or more of the device housing defined by the first device housing 301 and the second device housing 302 of the electronic device 110 and/or a display 114 of the electronic device 110 is receiving one of multi-handed touch input or single-handed touch input. One or more processors 305 of the electronic device 110 then cause the image capture device to capture one of: (1) a first quantity of images om response to the user input when the light sensor 320 determines that the electronic device 110 is situated within an environment other than a low-light environment; (2) capture a second quantity of images in response to the user input when the light sensor 320 determines the electronic device 110 is situated within the low-light environment and the one or more of the device housing defined by the first device housing 301 and the second device housing 302 and/or the display 114 of the electronic device 110 is receiving single-handed touch input; and (3) capture a third quantity of images in response to the user input when the light sensor 320 determines the electronic device 110 is situated within the low-light environment and the one or more of the device housing defined by the first device housing 301 and the second device housing 302 of the electronic device 110 and/or the display 114 of the electronic device 110 is receiving the multi-handed touch input.

In one or more embodiments, the second quantity of images is greater than the first quantity of images and the third quantity of images is greater than the second quantity of images. In one or more embodiments, the low-light environment is defined by a light density within the environment 312 is less than a predefined lux threshold, one example of which is one hundred.

In one or more embodiments, the determines a stability of the electronic device 110 to affect the number of images in one or more of the first quantity of images, the second quantity of images, and/or the third quantity of images. Illustrating by example, in one or more embodiments the difference between the third quantity of images and the first quantity of images increases when the stability of the electronic device 110 decreases.

Figure 5:
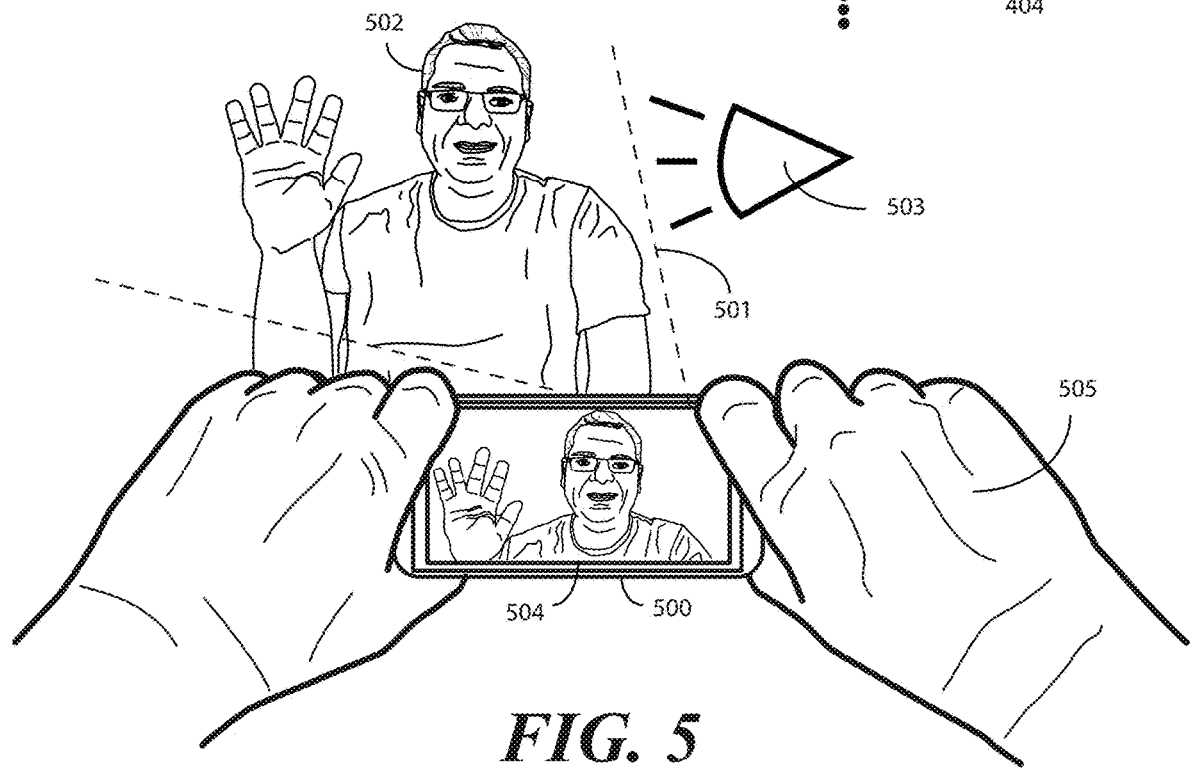
FIG. 5 illustrates one explanatory system in accordance with one or more embodiments of the disclosure.

Turning now to FIG. 5, illustrated therein is an example of an electronic device 500 configured in accordance with one or more embodiments of the disclosure in operation. Note that the electronic device 500 of FIG. 5, while including one or more of the components described above with reference to the block diagram schematic (300) of FIG. 3, is configured as a "candy bar" device having a single device housing rather than the first device housing (301), the second device housing (302), and the hinge (303) of the electronic device (110) of FIG. 3.

As shown in FIG. 5, an image capture device situated on a major surface of the electronic device 500 facing a subject 502. In this illustrative example, the subject 502 is situated within an environment experiencing an unbalanced ambient light level. This unbalanced ambient light level is occurring due to the fact that a large spotlight 503 is shining a bright light on the subject 502 while the subject 502 is situated in a very dark room.

In one or more embodiments, a light sensor of the electronic device 500 detects this unbalanced ambient light level occurring within the environment of the electronic device 500. At the same time, one or more touch sensors of the electronic device 500 determine that the electronic device 500 is being held with two hands. In this illustrative embodiment, the one or more touch sensors determine this by detecting that the electronic device 500 is being touched at opposite ends of a touch-sensitive display 504 positioned along a major face of the electronic device 500. Additionally, another image capture device, which is positioned under the left hand of the user 505 capturing the image of the subject 502, has its field of view obscured by that left hand. This confirms that the electronic device 500 is being supported by a multi-handed touch input.

Ordinarily, since the electronic device 500 is being supported by the multi-handed touch input, one or more processors of the electronic device 500 would cause the electronic device to capture, in response to user input initiating an image capture operation a first quantity of images that includes a greater number of images than a second quantity of images that would be captured when the electronic device 500 is being supported by single-handed touch input. However, in this embodiment the user 505 has configured one or more settings of the electronic device 500 to employ frame stacking only when the electronic device 500 is situated within a low-light environment or an unbalanced ambient light level. Accordingly, the one or more processors cause the image capture device, in response to the user input initiating the image capture operation, to capture the first quantity of images when the electronic device 500 is situated within a low-light environment or an unbalanced ambient light level. Since that is the case here, the one or more processors of the electronic device 500 cause the image capture device to capture the first quantity of images 501.

Figure 6:
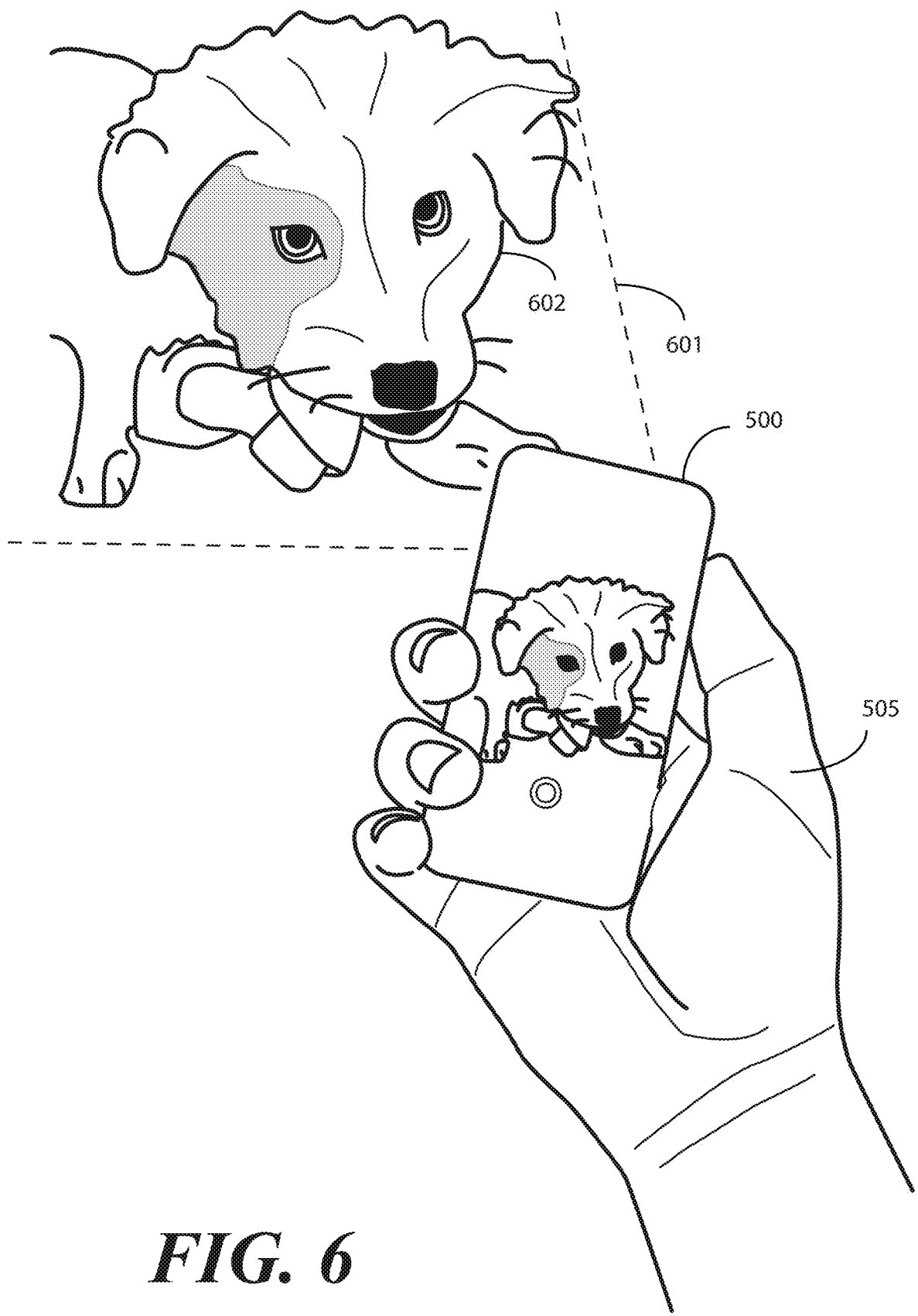
FIG. 6 illustrates another explanatory system in accordance with one or more embodiments of the disclosure.

Turning now to FIG. 6, the user 505 is again employing the electronic device 500 to capture images of a subject 602. However, in this situation the electronic device 500 is being supported by a single-handed touch input, which is detected by the one or more touch sensors. Since this is the case, in response to user input initiating an image capture operation, the one or more processors of the electronic device 500 cause the image capture device to capture a second quantity of images 601 having fewer images than the first quantity of images (501) of FIG. 1.

Figure 7:
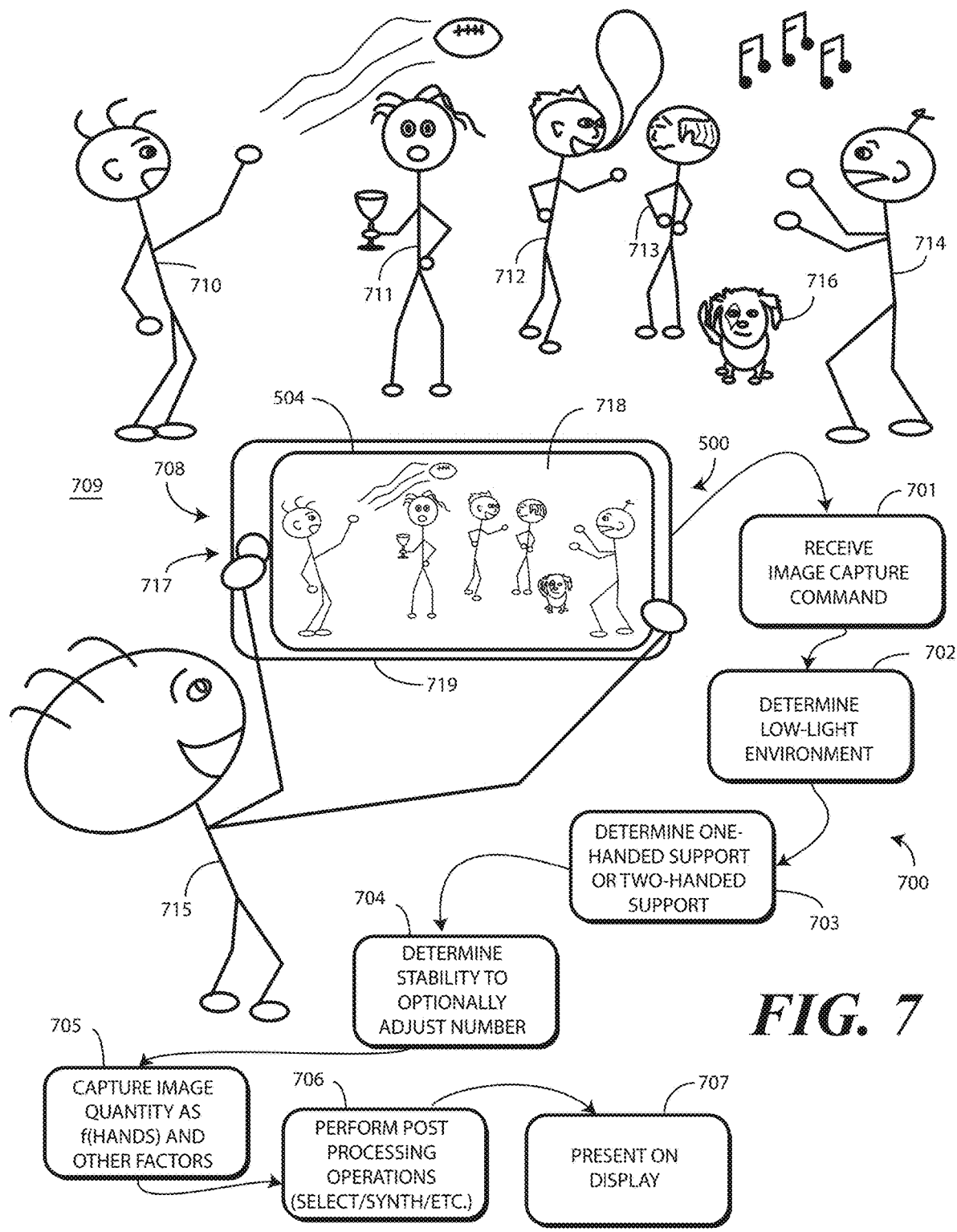
FIG. 7 illustrates yet another explanatory method and system in accordance with one or more embodiments of the disclosure.

Turning now to FIG. 7, illustrates therein is yet another method 700 and system 708 configured in accordance with one or more embodiments of the disclosure. An electronic device 500 is positioned within an environment 709. A plurality of persons 710, 711, 712, 713, 714, 715 is situated within the environment 709 of the electronic device 500. Here, there are six persons 710, 711, 712, 713, 714, 715 situated within the environment 709 of the electronic device 500. Person 715 is an authorized user of the electronic device 500, while persons 710, 711, 712, 713, 714 are friends, family, or acquaintances of the authorized user.

In this illustration, used to more particularly describe various features and advantages of embodiments of the disclosure, there is a lot occurring. The scene set forth in the environment 709 of the electronic device 500 is not dissimilar to that which may occur at a family gathering, family reunion, school reunion, and so forth. In this illustration, person 710 is passing a football to person 714. Person 711 is watching the action while sipping on a cocktail. Person 712 is having a conversation with person 713. Music is playing. A dog 716 is enjoying the weather and is dreaming of his next meal. Desirous of memorializing this moment of joy and whimsy, person 715 delivers user input 717 to a user interface of the electronic device 500 initiating an image capture operation to capture an image 718 of the environment 709. This user input 717 is received by one or more processors of the electronic device 500 at step 701.

In this illustrative example, the user input 717 comprises touch input. However, the user input 717 can take other forms as well. In this illustration, person 715 delivers a single press to a button with their finger to deliver the user input 717 initiating the image capture operation to the user interface of the electronic device 500. In another embodiment, the person 715 may deliver the user input 717 initiating the image capture operation to the user interface of the electronic device 500 by touching a user interface target presented on the display 504.

In another embodiment, person 715 may deliver the user input 717 initiating the image capture operation to the user interface of the electronic device 500 by delivering an audio command to an audio input of the electronic device 500. In still another embodiment, person 715 may deliver gesture input to deliver the user input 717 initiating the image capture operation to the user interface of the electronic device 500. In still another embodiment, person 715 delivers the user input 717 initiating the image capture operation to the user interface of the electronic device 500 by delivering touch or gesture input to a companion device of the electronic device 500, such as a smart watch.

In still another embodiment, person 715 may deliver user input 717 initiating the image capture operation to the user interface by performing a sequence of operations. Illustrating by example, in one or more embodiments person 715 can deliver the user input 717 by holding the electronic device 500 in a stationary position, as well as in a "pointing direction," i.e., not flat, while speaking or blinking an eye or swiping a hand above the display 504 in free space. Other methods for delivering the user input 717 could include speaking a "key phrase" such as "say cheese, "smile," and so forth Still other methods for delivering the user input 717 initiating the image capture operation to the user interface of the electronic device 500 will be obvious to those of ordinary skill in the art having the benefit of this disclosure.

Unfortunately, it is getting a bit late at this family gathering. Accordingly, if person 715 were using a prior art device, he may not catch all of the action and whimsy. The spiraling football, as well as the sweat pouring off or person 714 while trying to catch the same, might be blurred. The signal to noise ratio may be so low that it may be difficult to see what type of cocktail person 711 is enjoying. Poor image quality may make it difficult to determine whether person 712 and person 713 are enjoying a good joke or fighting.

Fortunately, the electronic device 500 is configured in accordance with embodiments of the disclosure. Accordingly, at step 702 a light sensor determines whether the electronic device 500 is situated within a low-light environment. In this example, the light density within the environment 709 is down to 88 lux. Accordingly, at step 702 the light sensor determines that the environment 709 is indeed a low-light environment.

At step 703, one or more touch sensors of the electronic device 500 determine whether one or more of a device housing 719 of the electronic device 500 and/or a display 504 of the electronic device 500 is receiving a single-handed touch input or a multi-handed touch input. As shown in FIG. 7, person 715 is indeed supporting the electronic device 500 with multi-handed touch input. In one or more embodiments, step 703 determines this by detecting a first touch input and a second touch input situated on opposite sides of the display 504, which is touch-sensitive in this illustrative embodiment.

At step 704, a motion detector of the electronic device 500 determines a stability of the electronic device 500. In one or more embodiments, when the stability is below a predefined threshold, which indicates that the electronic device 500 is shaking or moving, a quantity of images to be captured in response to the user input 717 received at step 701 will be increased so that a larger number of images can be fed into a frame stacking process. Here, the motion detector of the electronic device 500 determines at step 704 that the stability of the electronic device 500 is indeed below the predefined threshold.

At step 705, the one or more processors of the electronic device 500 cause the image capture device facing persons 710, 711, 712, 713, 714 to capture a quantity of images. This quantity could be one of three or more quantities. Illustrating by example, if the environment 709 had not been a low-light environment, the one or more processors of the electronic device 500 may cause the image capture device to capture a first quantity of images. In one or more embodiments, this first quantity of images is captured regardless of whether the electronic device 500 is supported by a single-handed touch input or a multi-handed touch input whenever the environment 709 includes a light intensity of greater than a predefined number of lux, such as one hundred lux.

However, since the electronic device 500 is situated in a low-light environment, the one or more processors of the electronic device 500 may cause the image capture device to capture different quantities of images. If, for example, one or more of the device housing 719 of the electronic device 500 and/or the display 504 of the electronic device 500 were receiving single-handed touch input, the one or more processors of the electronic device 500 would cause the image capture device to capture a second quantity of images in response to the user input 717 initiating the image capture operation that was received at step 701.

However, since the device housing 719 of the electronic device 500 and/or the display 504 of the electronic device 500 is receiving the multi-handed touch input in FIG. 7, the one or more processors of the electronic device 500 cause the image capture device to capture a third quantity of images. This third quantity of images is greater than either the second quantity of images or the first quantity of images. In one or more embodiments, the second quantity of images is greater than the first quantity of images, but the third quantity of images is greater than the second quantity of images. Moreover, since the stability of the electronic device 500 was determined to be below a predefined threshold at step 704, the third quantity of images is increased. Said differently, the difference between the third quantity of images and the first quantity of images increases as the stability of the electronic device 500 decreases in one or more embodiments.

At step 706, one or more post-processing operations can be performed. In one or more embodiments, step 706 comprises the one or more processors of the electronic device 500 synthesizing the third quantity of images to form a composite image when the light sensor determines the electronic device 500 is situated within the low-light environment and the one or more of the device housing 719 of the electronic device 500 and/or the display 504 of the electronic device 500 is receiving the multi-handed touch input. Other examples of post processing operations were described above. Still others will be obvious to those of ordinary skill in the art having the benefit of this disclosure. The resulting image 718 can then be presented on the display 504 to person 715 at step 707, who appears very pleased.

Figure 8:
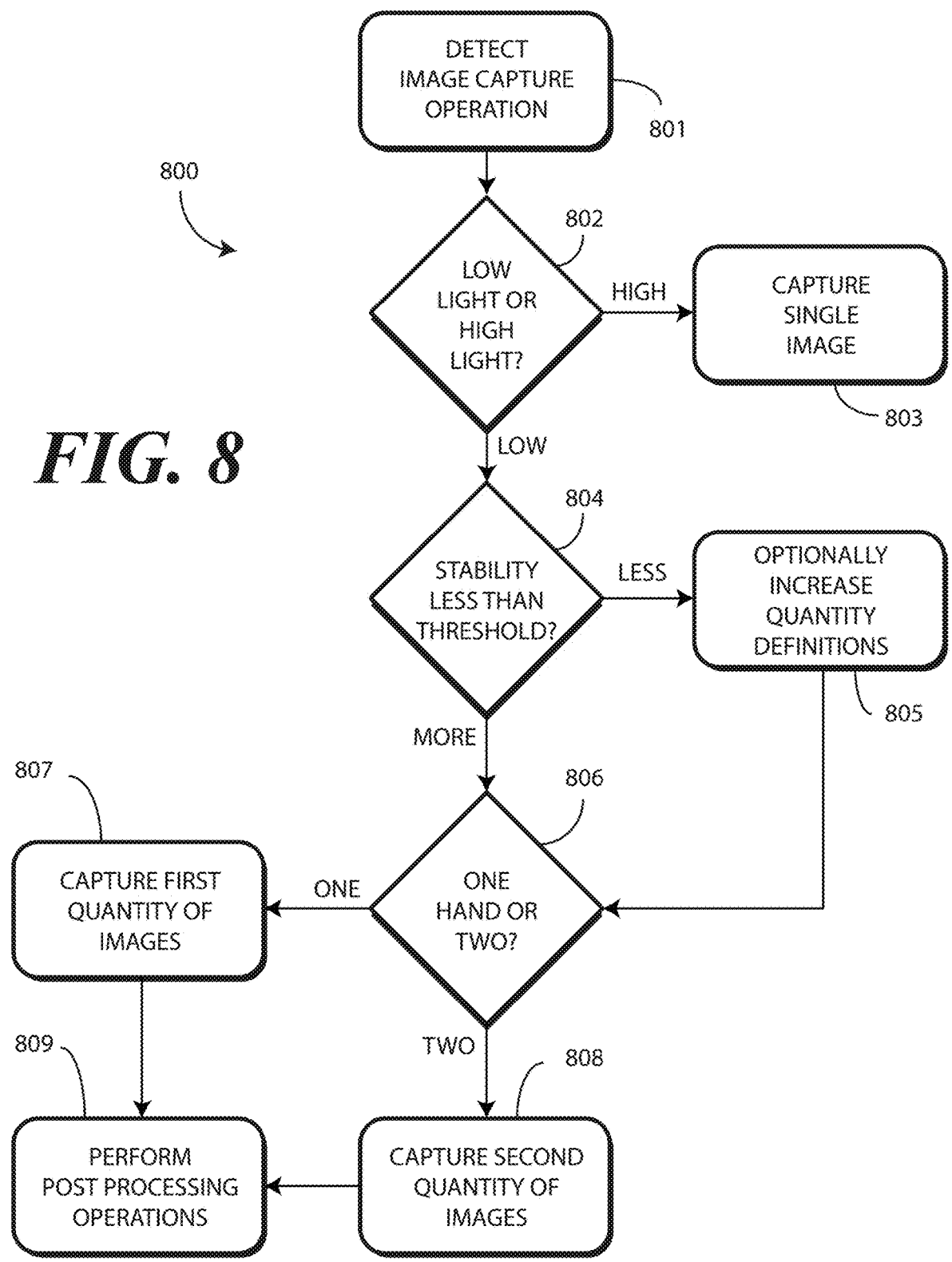
FIG. 8 illustrates still another explanatory method in accordance with one or more embodiments of the disclosure.

A summary of the method 700 of FIG. 7 is shown in FIG. 8. Turning now to FIG. 8, at step 801 a method 800 in an electronic device receives, by a user interface, user input initiating an image capture operation. At decision 802, a light sensor of the electronic device determines whether an environment of the electronic device is experiencing a low-light condition. Where it is not, either a single image or a small quantity of images is captured at step 803 in response to the user input received at step 801.

Where the electronic device is experiencing a low-light condition, decision 804 determines, with a motion sensor of the electronic device, a stability indication of the electronic device, and whether that stability indication of the electronic device is above, or less than, a predetermined threshold. Where the stability indication of the electronic device is below the predetermined threshold, optional step 805 comprises increasing the quantity of images that will be captured at subsequent steps of the method 800.

Decision 806 determines, with one or more touch sensors, whether the electronic device is being supported by a multi-handed touch input or a single-handed touch input. Step 807 comprises capturing, with an image capture device in response to the user input received at step 801, a first quantity of images when the electronic device is being supported by the single-handed touch input. By contrast, step 808 comprises capturing, with the image capture device in response to the user input received at step 801, a second quantity of images when the electronic device is being supported by multi-handed touch input. In one or more embodiments, the second quantity of images is greater than the first quantity of images.

Post processing operations can then be performed at step 809. These post processing operations include performing a frame stacking operation, and optimal image selection operation, and/or presenting a resulting image on a display of the electronic device. Other examples of post-processing operations will be obvious to those of ordinary skill in the art having the benefit of this disclosure.

Figure 9:
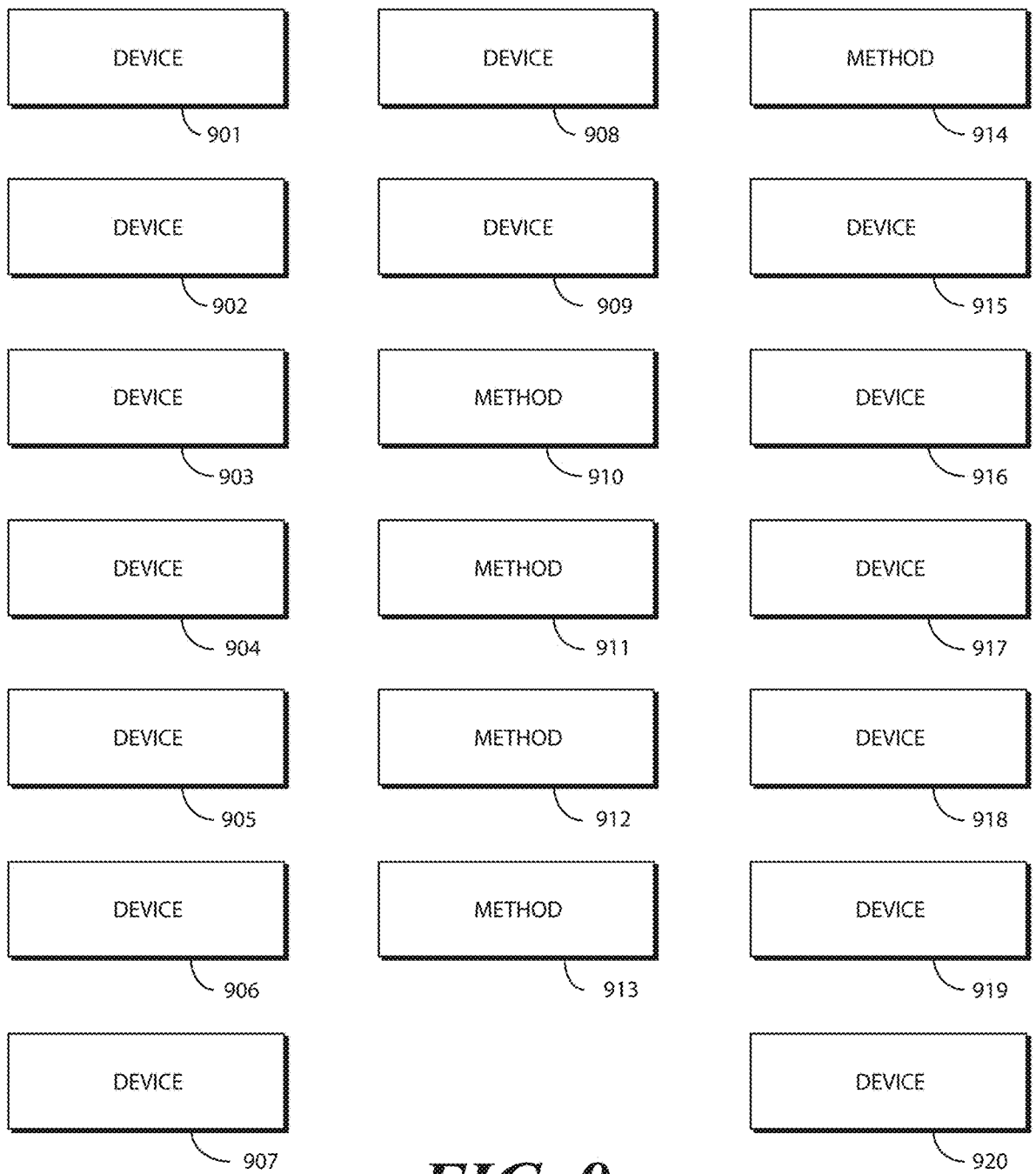
FIG. 9 illustrates various embodiments of the disclosure.

Turning now to FIG. 9, illustrated therein are various embodiments of the disclosure. The embodiments of FIG. 9 are shown as labeled boxes in FIG. 9 due to the fact that the individual components of these embodiments have been illustrated in detail in FIGS. 1-8, which precede FIG. 9. Accordingly, since these items have previously been illustrated and described, their repeated illustration is no longer essential for a proper understanding of these embodiments. Thus, the embodiments are shown as labeled boxes.

At 901, an electronic device comprises a device housing supporting a user interface, one or more touch sensors, and at least one image capture device. At 901, the electronic device comprises one or more processors operable with the user interface, the one or more touch sensors, and the at least one image capture device.

At 901, the one or more processors cause, in response to the user interface receiving user input initiating an image capture operation, the at least one image capture device to capture a first plurality of images when the one or more touch sensors detect a multi-handed touch input. At 901, the one or more processors cause, in response to the user interface receiving user input initiating an image capture operation, the at least one image capture device to capture a second plurality of images when the one or more touch sensors detect a single-handed touch input. At 901, the first plurality of images includes a greater number of images than the second plurality of images.

At 902, the one or more processors of 901 cause the at least one image capture device to capture the first plurality of images when the one or more touch sensors detect the multi-handed touch input while the user input initiating the image capture operation is received.

At 903, the electronic device of 901 further comprises a light sensor. At 904, the one or more processors of 903 cause the at least one image capture device to capture the first plurality of images only when the one or more touch sensors detect the multi-handed touch input concurrently with the light sensor detecting a low-light condition within an environment of the electronic device. At 905, the low-light condition of 904 comprises a light density of less than one hundred lux within the environment of the electronic device.

At 906, the user interface of 901 comprises a touch-sensitive display. At 906, the one or more touch sensors detect the multi-handed touch input by detecting a first touch input at a first location and a second touch input at a second location that is separated from the first location by the touch-sensitive display.

At 907, the user interface of 901 comprises a touch-sensitive display positioned on a first major surface of the electronic device. At 907, the one or more touch sensors detect the multi-handed touch input by detecting a first touch input on the touch-sensitive display and a second touch input on a second major surface of the electronic device.

At 908, the user interface of 901 comprises a touch-sensitive display positioned on a first major surface of the electronic device. At 908, the at least one image capture device comprises a first image capture device positioned on the first major surface and a second image capture device positioned on a second major surface of the electronic device. At 908, the one or more processors cause the at least one image capture device to capture the first plurality of images when both a field of view of one of the first image capture device or the second image capture device is obscured by an object proximately located with the electronic device and the one or more touch sensors detect the multi-handed touch input.

At 909, the greater number of images in the first plurality of images of 901 is at least two times another number of images in the second plurality of images.

At 910, a method in an electronic device comprises receiving, by a user interface, user input initiating an image capture operation. At 910, the method comprises determining, with one or more touch sensors, whether the electronic device is being supported by a multi-handed touch input or a single-handed touch input.

At 910, the method comprises capturing, in response to the user input with an image capture device, a first quantity of images when the electronic device is being supported by the multi-handed touch input. At 910, the method comprises capturing, in response to the user input with the image capture device, a second quantity of images when the electronic device is being supported by the single-handed touch input. At 910, the first quantity of images is greater than the second quantity of images.

At 911, the method of 910 further comprises detecting, with a light sensor, an unbalanced ambient light level within an environment of the electronic device. At 911, the capturing the first quantity of images occurs only when the electronic device is being supported by the multi-handed touch input and the unbalanced ambient light level within the environment of the electronic device exceeds a predefined threshold.

At 912, the determining whether the electronic device is being supported by the multi-handed touch input of 910 further comprises determining, with another image capture device, whether a field of view of the another image capture device is obscured by a hand or finger. At 913, the multi-handed touch input of 910 is defined by the electronic device being touched at opposite ends of a touch-sensitive display positioned along a major face of the electronic device.

At 914, the method of 910 further comprises detecting, with a motion sensor, a stability indication of the electronic device in response to the user input initiating the image capture operation. At 914, the method comprises increasing, by one or more processors operable with the image capture device, the first quantity of images when the stability indication is less than a predefined threshold.

At 915, an electronic device comprises a user interface receiving user input initiating an image capture operation by an image capture device of the electronic device. At 915, the electronic device comprises a light sensor determining whether the electronic device is situated within a low-light environment.

At 915, the electronic device comprises one or more touch sensors determining whether one or more of a device housing of the electronic device and/or a display of the electronic device is receiving one of multi-handed touch input or single-handed touch input. At 915, the electronic device comprises one or more processors causing the image capture device to one of:

capture a first quantity of images in response to the user input when the light sensor determines the electronic device is situated within an environment other than the low-light environment;

capture a second quantity of images in response to the user input when the light sensor determines the electronic device is situated within the low-light environment and the one or more of the device housing of the electronic device and/or the display of the electronic device is receiving the single-handed touch input; and capture a third quantity of images in response to the user input when the light sensor determines the electronic device is situated within the low-light environment and the one or more of the device housing of the electronic device and/or the display of the electronic device is receiving the multi-handed touch input;

wherein the second quantity of images is greater than the first quantity of images and the third quantity of images is greater than the second quantity of images.

At 916, the low-light environment of 915 is defined by a light density of less than a predefined lux threshold.

At 917, the electronic device of 916 further comprises a motion detector determining a stability of the electronic device. At 917, a difference between the third quantity of images and the first quantity of images increases when the stability of the electronic device decreases.

At 918, the one or more processors of 917 synthesize the third quantity of images to form a composite image when the light sensor determines the electronic device is situated within the low-light environment and the one or more of the device housing of the electronic device and/or the display of the electronic device is receiving the multi-handed touch input.

At 919, the user interface of 916 comprises a touch-sensitive display. At 919, the multi-handed touch input comprises a first touch input and a second touch input situated on opposite sides of the touch-sensitive display.

At 920, the electronic device of 916 further comprises another image capture device. At 920, the multi-handed touch input is determined when a field of view of the other image capture device is obscured by an object delivering touch input to the one or more touch sensors.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a device housing supporting a user interface, one or more touch sensors, and at least one image capture device; and
one or more processors operable with the user interface, the one or more touch sensors, and the at least one image capture device, the one or more processors causing, in response to the user interface receiving user input initiating an image capture operation, the at least one image capture device to capture:
a first plurality of images when the one or more touch sensors detect a multi-handed touch input; and
a second plurality of images when the one or more touch sensors detect a single-handed touch input;
wherein the first plurality of images includes a greater number of images than the second plurality of images.

2. The electronic device of claim 1, wherein the one or more processors cause the at least one image capture device to capture the first plurality of images when the one or more touch sensors detect the multi-handed touch input while the user input initiating the image capture operation is received.

3. The electronic device of claim 1, further comprising a light sensor.

4. The electronic device of claim 3, wherein the one or more processors cause the at least one image capture device to capture the first plurality of images only when the one or more touch sensors detect the multi-handed touch input concurrently with the light sensor detecting a low-light condition within an environment of the electronic device.

5. The electronic device of claim 4, wherein the low-light condition comprises a light density of less than one hundred lux within the environment of the electronic device.

6. The electronic device of claim 1, wherein the user interface comprises a touch-sensitive display, wherein the one or more touch sensors detect the multi-handed touch input by detecting a first touch input at a first location and a second touch input at a second location that is separated from the first location by the touch-sensitive display.

7. The electronic device of claim 1, wherein the user interface comprises a touch-sensitive display positioned on a first major surface of the electronic device, wherein the one or more touch sensors detect the multi-handed touch input by detecting a first touch input on the touch-sensitive display and a second touch input on a second major surface of the electronic device.

8. The electronic device of claim 1, wherein:
the user interface comprises a touch-sensitive display positioned on a first major surface of the electronic device;
the at least one image capture device comprises a first image capture device positioned on the first major surface and a second image capture device positioned on a second major surface of the electronic device; and
the one or more processors cause the at least one image capture device to capture the first plurality of images when both a field of view of one of the first image capture device or the second image capture device is obscured by an object proximately located with the electronic device and the one or more touch sensors detect the multi-handed touch input.

9. The electronic device of claim 1, wherein the greater number of images in the first plurality of images is at least two times another number of images in the second plurality of images.

10. A method in an electronic device, the method comprising:
receiving, by a user interface, user input initiating an image capture operation;
determining, with one or more touch sensors, whether the electronic device is being supported by a multi-handed touch input or a single-handed touch input;
capturing, in response to the user input with an image capture device, a first quantity of images when the electronic device is being supported by the multi-handed touch input; and
capturing, in response to the user input with the image capture device, a second quantity of images when the electronic device is being supported by the single-handed touch input;
wherein the first quantity of images is greater than the second quantity of images.

11. The method of claim 10, further comprising detecting, with a light sensor, an unbalanced ambient light level within an environment of the electronic device, wherein the capturing the first quantity of images occurs only when the electronic device is being supported by the multi-handed touch input and the unbalanced ambient light level within the environment of the electronic device exceeds a predefined threshold.

12. The method of claim 10, wherein the determining whether the electronic device is being supported by the multi-handed touch input further comprises determining, with another image capture device, whether a field of view of the another image capture device is obscured by a hand or finger.

13. The method of claim 10, wherein the multi-handed touch input is defined by the electronic device being touched at opposite ends of a touch-sensitive display positioned along a major face of the electronic device.

14. The method of claim 10, further comprising detecting, with a motion sensor, a stability indication of the electronic device in response to the user input initiating the image capture operation and increasing, by one or more processors operable with the image capture device, the first quantity of images when the stability indication is less than a predefined threshold.

15. An electronic device, comprising:
a user interface receiving user input initiating an image capture operation by an image capture device of the electronic device;
a light sensor determining whether the electronic device is situated within a low-light environment;
one or more touch sensors determining whether one or more of a device housing of the electronic device and/or a display of the electronic device is receiving one of multi-handed touch input or single-handed touch input; and one or more processors causing the image capture device to one of:
- capture a first quantity of images in response to the user input when the light sensor determines the electronic device is situated within an environment other than the low-light environment;
- capture a second quantity of images in response to the user input when the light sensor determines the electronic device is situated within the low-light environment and the one or more of the device housing of the electronic device and/or the display of the electronic device is receiving the single-handed touch input; and
- capture a third quantity of images in response to the user input when the light sensor determines the electronic device is situated within the low-light environment and the one or more of the device housing of the electronic device and/or the display of the electronic device is receiving the multi-handed touch input;

wherein the second quantity of images is greater than the first quantity of images and the third quantity of images is greater than the second quantity of images.

16. The electronic device of claim 15, wherein the low-light environment is defined by a light density of less than a predefined lux threshold.

17. The electronic device of claim 16, further comprising a motion detector determining a stability of the electronic device, wherein a difference between the third quantity of images and the first quantity of images increases when the stability of the electronic device decreases.

18. The electronic device of claim 17, wherein the one or more processors synthesize the third quantity of images to form a composite image when the light sensor determines the electronic device is situated within the low-light environment and the one or more of the device housing of the electronic device and/or the display of the electronic device is receiving the multi-handed touch input.

19. The electronic device of claim 16, wherein:
- the user interface comprises a touch-sensitive display; and
- the multi-handed touch input comprises a first touch input and a second touch input situated on opposite sides of the touch-sensitive display.

20. The electronic device of claim 16, further comprising another image capture device, wherein the multi-handed touch input is determined when a field of view of the another image capture device is obscured by an object delivering touch input to the one or more touch sensors.

\* \* \* \* \*